United States Patent
Noro et al.

(10) Patent No.: US 12,158,093 B2
(45) Date of Patent: Dec. 3, 2024

(54) METHOD FOR ESTIMATING HEAT GENERATION DISTRIBUTION IN HONEYCOMB STRUCTURE, METHOD FOR PRODUCING HONEYCOMB STRUCTURE AND METHOD FOR PRODUCING ELECTRICALLY HEATING SUPPORT

(71) Applicant: NGK INSULATORS, LTD., Nagoya (JP)

(72) Inventors: Takashi Noro, Nagoya (JP); Shungo Watanabe, Komaki (JP); Chikashi Ihara, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 493 days.

(21) Appl. No.: 17/582,064

(22) Filed: Jan. 24, 2022

(65) Prior Publication Data
US 2022/0316955 A1    Oct. 6, 2022

(30) Foreign Application Priority Data
Mar. 31, 2021 (JP) ................................ 2021-061937

(51) Int. Cl.
*F01N 3/20* (2006.01)
*F01N 3/28* (2006.01)

(52) U.S. Cl.
CPC ......... *F01N 3/2026* (2013.01); *F01N 3/2803* (2013.01)

(58) Field of Classification Search
CPC .... F01N 3/2026; F01N 3/2803; F01N 3/2825; F01N 11/00; F01N 2550/22; F01N 2900/0406; G01K 2217/00; G01K 7/16; G01K 3/14; H05B 3/03; H05B 3/141; G06F 17/10; G06Q 50/04
See application file for complete search history.

(56) References Cited

U.S. PATENT DOCUMENTS 11,473,980 B2 * 10/2022 Takase ................. F01N 11/005
2020/0300712 A1    9/2020 Takase

FOREIGN PATENT DOCUMENTS

JP            2020-153325 A        9/2020

* cited by examiner

*Primary Examiner* — Brandon D Lee
(74) *Attorney, Agent, or Firm* — BURR PATENT LAW, PLLC

(57) ABSTRACT

A method for estimating a heat generation distribution in a honeycomb structure includes: a first step of allowing a predetermined minute current to flow between electrode layers A1 and B1 to energize a honeycomb structure, and measuring surface potentials at multiple points; a second step of allowing a predetermined minute current to flow between electrode layers A2 and B2 to energize the honeycomb structure, and measuring surface potentials at multiple points; a third step of quantifying, based on the measured surface potentials at the multiple points, at least one of resistances at the multiple points in the honeycomb structure, resistance ratios for energization paths, voltage sharing ratios, and surface potentials of the electrode layers A1, A2, B1 and B2; and a step of estimating a heat generation distribution in the honeycomb structure based on the values quantified in the third step.

11 Claims, 9 Drawing Sheets

METHOD FOR ESTIMATING HEAT GENERATION DISTRIBUTION IN HONEYCOMB STRUCTURE, METHOD FOR PRODUCING HONEYCOMB STRUCTURE AND METHOD FOR PRODUCING ELECTRICALLY HEATING SUPPORT

FIELD OF THE INVENTION

The present invention relates to a method for estimating a heat generation distribution in a honeycomb structure, a method for producing a honeycomb structure and a method for producing an electrically heating support.

BACKGROUND OF THE INVENTION

Recently, electrically heating catalysts (EHCs) have been proposed to improve exhaust gas purification performance immediately after engine start-up. In the EHCs, it is desirable to reduce temperature irregularities and achieve a uniform temperature distribution in a honeycomb structure in order to obtain a sufficient catalytic effect.

Conventionally, as a performance evaluation for a honeycomb structure, a temperature distribution in the honeycomb structure is actually examined when causing the honeycomb structure to generate heat by electric conduction. Patent literature 1 discloses a method for estimating a heat generation distribution in a honeycomb structure by energizing the honeycomb structure, measuring resistances at multiple points, estimating current values at the measured points, and calculating an amount of heat generated based on the estimated values.

CITATION LIST

Patent Literatures

[Patent Literature 1] Japanese Patent Application Publication No. 2020-153325 A

SUMMARY OF THE INVENTION

As a result of studies for the inspection method described in Patent Literature 1, the present inventors have found that the estimated heat generation distribution does not fully reproduce the heat generation distribution when the honeycomb structure is actually heated by electrical conduction, and that there is room for improvement. Therefore, there is a need for further improvement in the inspection method for the heat generation performance of honeycomb structures and electrically heating supports.

The present invention has been made in view of the above circumstances. An object of the present invention is to provide a method for estimating a heat generation distribution in a honeycomb structure, which can simply and inexpensively estimate the heat generation distribution of the honeycomb structure, and which can more accurately estimate it. Also, an object of the present invention is to provide a method for producing the above honeycomb structure and an electrically heating support.

The above objects can be achieved by the following inventions. Thus, the present invention is specified as follows:

(1)

A method for estimating a heat generation distribution in a honeycomb structure, the honeycomb structure comprising:

a pillar shaped honeycomb structure portion comprising: an outer peripheral wall; and a partition wall disposed on an inner side of the outer peripheral wall, the partition wall defining a plurality of cells, each of the plurality of cells extending from one end face to other end face to form a flow path; and a pair of an electrode layer A and an electrode layer B disposed on a surface of the outer peripheral wall of the pillar shaped honeycomb structure portion so as to face each other across a central axis of the pillar shaped honeycomb structure portion, wherein the electrode layer A and the electrode layer B are electrically separated into an electrode layer A1 and an electrode layer A2, and an electrode layer B1 and an electrode layer B2, respectively, wherein the electrode layer A1 and the electrode layer B1, and the electrode layer A2 and the electrode layer B2 are located on sides close to each other on the outer peripheral surface of the honeycomb structure, respectively, wherein the method comprises:

a first step of allowing a predetermined minute current to flow between the electrode layers A1 and B1 to energize the pillar shaped honeycomb structure, and measuring surface potentials at multiple points spaced along a circumferential direction from the electrode layer A1 to the electrode layer B1 on the outer peripheral wall and surfaces of the electrode layers;

a second step of allowing a predetermined minute current to flow between the electrode layers A2 and B2 to energize the pillar shaped honeycomb structure, and measuring surface potentials at multiple points spaced along a circumferential direction from the electrode layer A2 to the electrode layer B2 on the surface of the outer peripheral wall and surfaces of the electrode layers;

a third step of quantifying, based on the measured surface potentials at the multiple points, at least one of resistances at the multiple points in the honeycomb structure, resistance ratios for energization paths, voltage sharing ratios, and surface potentials of the electrode layers A1, A2, B1 and B2; and a step of estimating a heat generation distribution in the honeycomb structure based on the values quantified in the third step.

(2)

A method for producing a honeycomb structure, comprising:

a step of calculating the quantified values in the third step of the honeycomb structure before inspection by the method for estimating the heat generation distribution in the honeycomb structure according to (1); and an inspection step of evaluating the quantified values in the third step based on threshold values obtained in the step of estimating the heat generation distribution in the honeycomb structure, and selecting a passed product.

(3)

A method for producing an electrically heating support, comprising:

a step of calculating the quantified values in the third step of the honeycomb structure before inspection by the method for estimating the heat generation distribution in the honeycomb structure according to (1); and an inspection step of evaluating the quantified values in the third step based on threshold values obtained in the step of estimating the heat generation distribution in the honeycomb structure, and selecting a passed product.

According to the present invention, it is possible to provide a method for estimating a heat generation distribution in a honeycomb structure, which can simply and inexpensively estimate the heat generation distribution in the honeycomb structure, and which can more accurately estimate it. Also, according to the present invention, it is possible to provide a method for producing the above honeycomb structure and an electrically heating support.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

<Method for Estimating Heat Generation Distribution in Honeycomb Structure>

(1. Honeycomb Structure)

Figure 1:
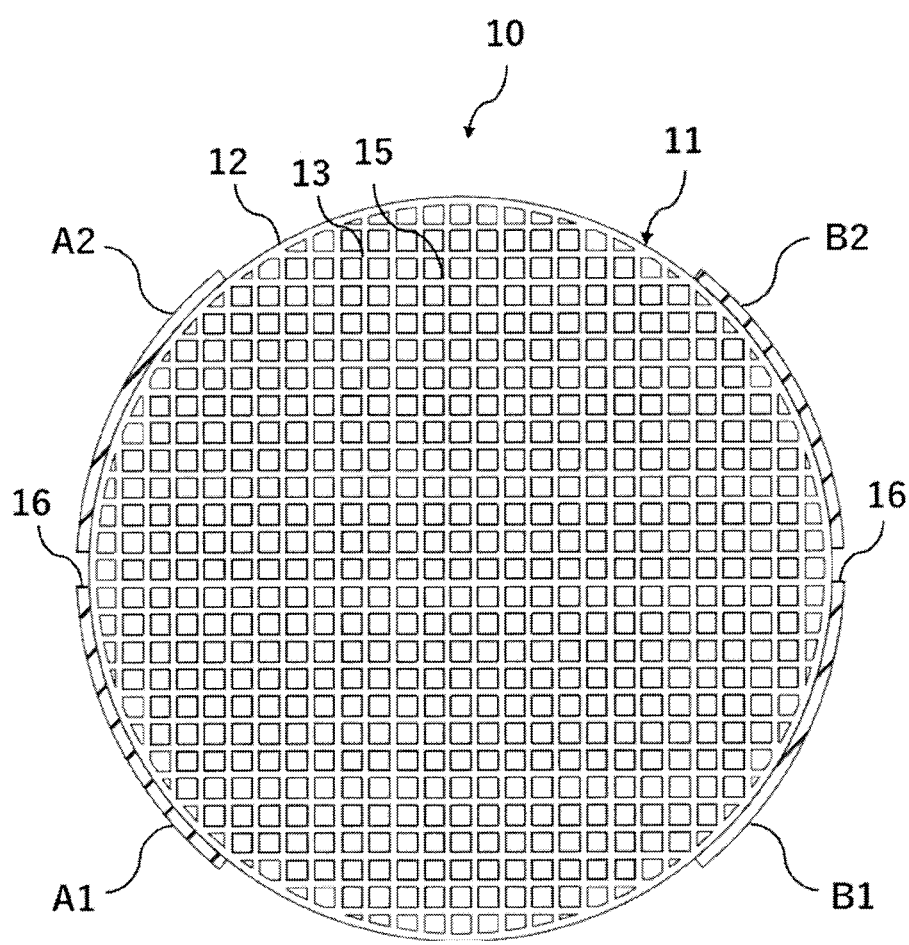
FIG. 1 is a schematic cross-sectional view perpendicular to an extending direction of cells of a honeycomb structure according to an embodiment of the present invention.

FIG. 1 is a schematic external view of a honeycomb structure 10 to be measured for a heat generation distribution by a method for estimating a heat generation distribution in a honeycomb structure according to an embodiment of the present invention, which is perpendicular to an extending direction of cells 15.

The honeycomb structure 10 is provided with a pillar shaped honeycomb structure portion 11 including: an outer peripheral wall 12; and a partition wall 13 which is disposed on an inner side of the outer peripheral wall 12 and define a plurality of cells 15 extending from one end face to other end face to form flow paths.

An outer shape of the pillar shaped honeycomb structure portion 11 is not particularly limited as long as it is pillar shaped. For example, the honeycomb structure portion can have a shape such as a pillar shape with circular end faces (cylindrical shape), a pillar shape with oval end faces, and a pillar shape with polygonal (quadrangular, pentagonal, hexagonal, heptagonal, octagonal, etc.) end faces. Also, the size of the pillar shaped honeycomb structure portion 11 is not particularly limited, but an area of the end faces may be from 2000 to 20000 $mm^2$, for example.

The pillar shaped honeycomb structure portion 11 is made of conductive ceramics. Electrical resistivity of the ceramics is not particularly limited as long as the honeycomb structure 10 can generate heat by Joule heat upon energization. The pillar shaped honeycomb structure may have an electrical resistivity of from 1 to 200 Ωcm. In the present invention, the electrical resistivity of the pillar shaped honeycomb structure portion 11 is a value measured at 25° C. by a four-terminal method.

Examples of the ceramics forming the pillar shaped honeycomb structure portion 11 include, but not limited to, oxide ceramics such as alumina, mullite, zirconia, and cordierite, and non-oxide ceramics such as silicon carbide, silicon nitride, and aluminum nitride. Further, a silicon carbide-metal silicon composite material, a silicon carbide/graphite composite material, or the like can also be used. Among them, preferably, the material of the outer peripheral wall and the partition wall is mainly based on the silicon-silicon carbide composite material or on silicon carbide, and more preferably the material is the silicon-silicon carbide composite material or silicon carbide, in terms of achieving both heat resistant and electrical conductivity. The phrase "the material of the outer peripheral wall and the partition wall is mainly based on a silicone-silicon carbide composite material" as used herein means that each of the outer peripheral wall and the partition wall contains 90% by mass or more of the silicon-silicon carbide composite material (total mass) based on the entire honeycomb structure portion. Here, the silicon-silicon carbide composite material contains silicon carbide particles as an aggregate and silicon as a bonding material for bonding the silicon carbide particles, and a plurality of silicon carbide particles are preferably bonded by silicon so as to form pores between the silicon carbide particles. The phrase "the material of the outer peripheral wall and the partition wall is mainly based on silicon carbide" as used herein means that each of the outer peripheral wall and the partition wall contains 90% by mass or more of the silicon carbide (total mass) based on the entire honeycomb structure portion.

The cell shape of the pillar shaped honeycomb structure 11 is not particularly limited, but in a cross section orthogonal to a central axis of the pillar shaped honeycomb structure 11, it may be a polygon such as a triangle, a quadrangle, a pentagon, a hexagon, and an octagon; a circle; or an ellipse, or other irregular shapes. Preferably, the cell shape is polygonal.

The partition wall 13 preferably has a thickness of from 0.05 to 0.50 mm, and more preferably from 0.10 to 0.45 mm in terms of ease of production. For example, the thickness of 0.05 mm or more can allow the strength of the pillar shaped honeycomb structure portion 11 to be further increased, and the thickness of 0.50 mm or less can lead to a decreased pressure loss. As used herein, the thickness of the partition wall 13 is defined as a length of a portion passing through the partition wall 13, among line segments connecting centers of gravity of the adjacent cells 15 in the cross section perpendicular to the extending direction of the cells 15.

The cell density of the pillar shaped honeycomb structure 11 is not particularly limited, but it is preferably in a range of from 5 to 150 cells/cm², more preferably in a range of from 5 to 100 cells/cm², and even more preferably in a range of from 31 to 80 cells/cm².

The outer peripheral wall 12 may have a thickness of from 0.1 mm to 1.0 mm, although not limited thereto. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells.

The partition wall 13 may be dense. However, the partition wall 13 is preferably porous. A porosity of the partition wall 13 may be from 35 to 60%, although not limited thereto. The porosity is a value measured by a mercury porosimeter. It should be noted that the term "dense" as used herein refers to a porosity of 5% or less.

The partition wall 13 may have an average pore diameter of from 2 to 15 μm, although not limited thereto. The average pore diameter is a value measured by a mercury porosimeter.

The honeycomb structure 10 is provided with a pair of an electrode layer A and an electrode layer B (the electrode layer A and the electrode layer B form one pair) so as to face each other across a central axis of the pillar shaped honeycomb structure portion 11 on the surface of the outer peripheral wall 12 of the pillar shaped honeycomb structure portion 11. The electrode layer A is electrically separated into an electrode layer A1 and an electrode layer A2, and the electrode layer B is electrically separated into an electrode layer B1 and an electrode layer B2. The electrode layer A1 and the electrode layer B1, and the electrode layer A2 and the electrode layer B2 are located on sides close to each other on the outer peripheral surface of the honeycomb structure 10, respectively. That is, the electrode layer A1, the electrode layer B1, the electrode layer B2, and the electrode layer A2 are arranged in this order along the outer peripheral surface of the honeycomb structure 10.

In the embodiment shown in FIG. 1, the electrode layer A1 and the electrode layer A2, and the electrode layer B1 and the electrode layer B2 are electrically separated by slits 16 along the extending direction of the pillar shaped honeycomb structure 11, respectively. The "electrically separated" as used herein means that no electricity flows through the electrode layers themselves. The electrical separation of the electrode layers A1 and A2, and the electrode layers B1 and B2, is not limited to the use of the slits. It may also include a method of printing separate electrode layers in advance, or a method of providing insulating members to be electrically separated. In the case of electrical separation by the use of the slits 16, a width of each slit can be from 0.5 to 5 mm, for example.

From the viewpoint of improving the uniform heat generation of the pillar shaped honeycomb structure portion 11, each of the electrode layers A1, A2, B1, B2 can be provided so as to extend in a band shape on the outer surface of the outer peripheral wall 12 in the circumferential direction of the outer peripheral wall 12 and in the extending direction of the cells. Specifically, each of the electrode layers A1, A2, B1, and B2 can be provided so as to extend over a length of 80% or more between both ends of the pillar shaped honeycomb structure portion 11.

The thickness of each of the electrode layers A1, A2, B1 and B2 is not particularly limited, but it may be 0.01 to 5 mm. The thickness of each of the electrode layers A1, A2, B1 and B2 is defined as a thickness of a measured position on the outer surface of each of the electrode layers A1, A2, B1 and B2 in a direction of a normal line to a tangent line when the measured position is observed in the cross section perpendicular to the extending direction of the cells.

A lower electrical resistivity of each of the electrode layers A1, A2, B1 and B2 than that of the pillar shaped honeycomb structure portion 11 leads to preferential flowing of electricity to the electrode layers, and easy spreading of electricity in the flow path direction of the cells and in the circumferential direction during energization. The electrical resistivity of each of the electrode layers A1, A2, B1 and B2 is not limited, but it may be ¹⁄₁₀ or less of the electrical resistivity of the pillar shaped honeycomb structure portion 11. The lower limit of the electrical resistivity of each the electrode layers A1, A2, B1 and B2 is not particularly limited, but it may preferably be ¹⁄₂₀₀ or more, for example. The electrical resistivity of each of the electrode layers A1, A2, B1 and B2 is a value measured at 25° C. by the four-terminal method.

Each of the electrode layers A1, A2, B1 and B2 may be made of a metal and a conductive ceramic. Examples of the metal include a single metal of Cr, Fe, Co, Ni, Si or Ti, or an alloy containing at least one metal selected from the group consisting of those metals. Non-limiting examples of the conductive ceramic include silicon carbide (SiC), metal compounds such as metal silicides such as tantalum silicide (TaSi$_2$) and chromium silicide (CrSi$_2$), and further a composite material (cermet) comprised of a combination of one or more of the conductive ceramics and one or more of the above metals. Specific examples of the cermet include a composite material of metallic silicon and silicon carbide, a composite material of metallic silicide such as tantalum silicide and chromium silicide, metallic silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. Among the various metals and conductive ceramics as described above, the material of the electrode layers A1, A2, B1 and B2 may be, for example, a combination of a metal silicide such as tantalum silicide and chromium silicide with a composite material of metallic silicon and silicon carbide.

On the outer peripheral wall 12 of the pillar shaped honeycomb structure portion 11, the slits may be provided along the extending direction of the cells 15 between the surface provided with the electrode layer A1 and the surface provided with the electrode layer B1 and/or between the surface provided with the electrode layer A2 and the electrode layer B2, respectively. According to such a configuration, a thermal stress relaxation property of the honeycomb structure 10 is improved. The length and width of each of these slits (thermal stress relaxation slits) are not particularly limited, and they may be appropriately designed depending on desirable thermal stress relaxation properties.

(2. Method for Estimating Heat Generation Distribution in Honeycomb Structure)

Figure 2:
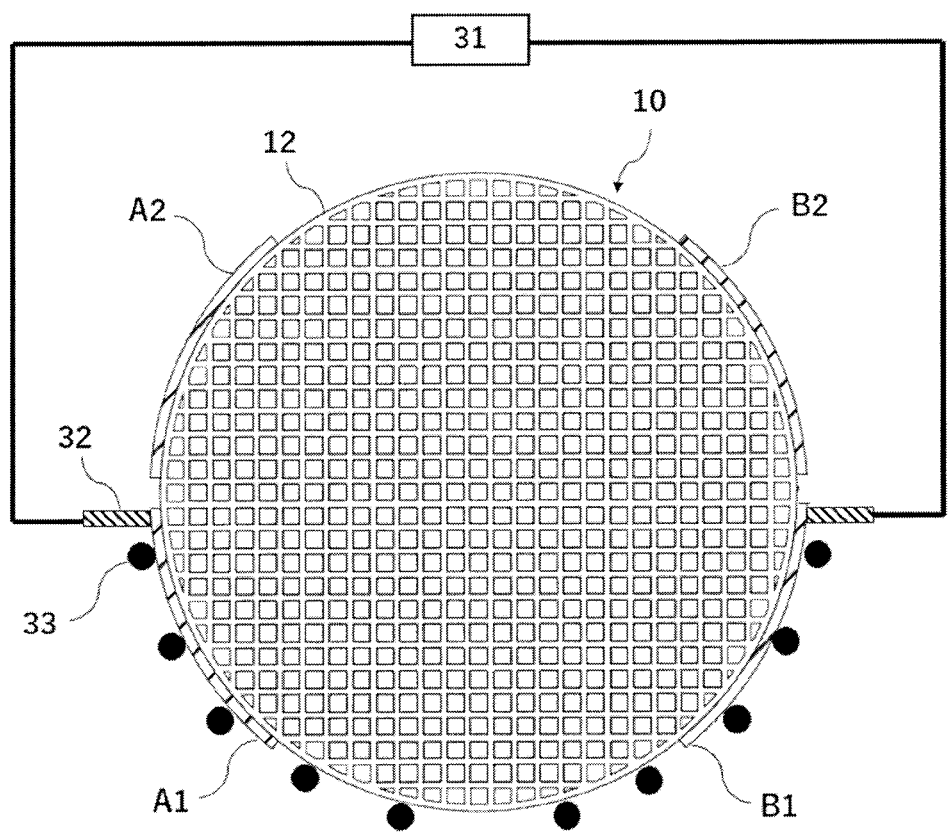
FIG. 2 is a schematic view for explaining a method for measuring a surface potential of a honeycomb structure according to an embodiment of the present invention.

A method for estimating a heat generation distribution in the honeycomb structure according to an embodiment of the present invention will be now described in detail. First, as shown in FIG. 2, a predetermined minute current is allowed to flow between the electrode layer A1 and the electrode layer B1 to energize the pillar shaped honeycomb structure portion. At this time, two current terminals 32 electrically connected from a power supply unit 31 are pressed against the electrode layer A1 and the electrode layer B1 of the honeycomb structure 10, respectively, to maintain the energized state. The minute current flowing between the electrode layer A1 and the electrode layer B1 has a current having a magnitude enough not to cause heat generation of the honeycomb structure 10. The minute current enough not to cause heat generation of the honeycomb structure 10 can be from 1 to 1000 mA, although it depends on the material and electrical resistivity of the honeycomb structure 10. In this range, a constant current is allowed to flow between the electrode layer A1 and the electrode layer B1. Further, when the honeycomb structure is made of a dense material having a lower resistance, the current is preferably in a range of from 10 to 1000 mA, and when the honeycomb structure is porous, it has a relatively higher resistance than that of the dense material having a lower resistance. Therefore, the current is preferably in a range of from 10 to 100 mA.

Subsequently, in a state where the predetermined minute current is allowed to flow between the electrode layer A1 and the electrode layer B1 to energize the pillar shaped honeycomb structure portion, surface potentials at multiple points spaced along the circumferential direction from the electrode layer A1 to the electrode layer B1 are measured on the surfaces of the outer peripheral wall 12 and the electrode layers A1 and B1. FIG. 2 shows, as an example, measured points 33 at three points on the electrode layer A1, four points on the surface of the outer peripheral wall 12 between the electrode layer A1 and the electrode layer B1, and three points on the electrode layer B1. The number of the measured points for the surface potentials on the electrode layer A1, the number of the measured points for the surface potentials on the surface of the outer peripheral wall 12 between the electrode layer A1 and the electrode layer B1, and the number of the measured points for the surface potentials on the electrode layer B1 are not limited to the example shown in FIG. 2, and they can be set as needed. However, it is preferable to measure the surface potentials at least two points or more for each position. A larger number of the measured points can lead to more detailed and accurate estimation of the heat generation distribution in the honeycomb structure 10.

Figure 3:
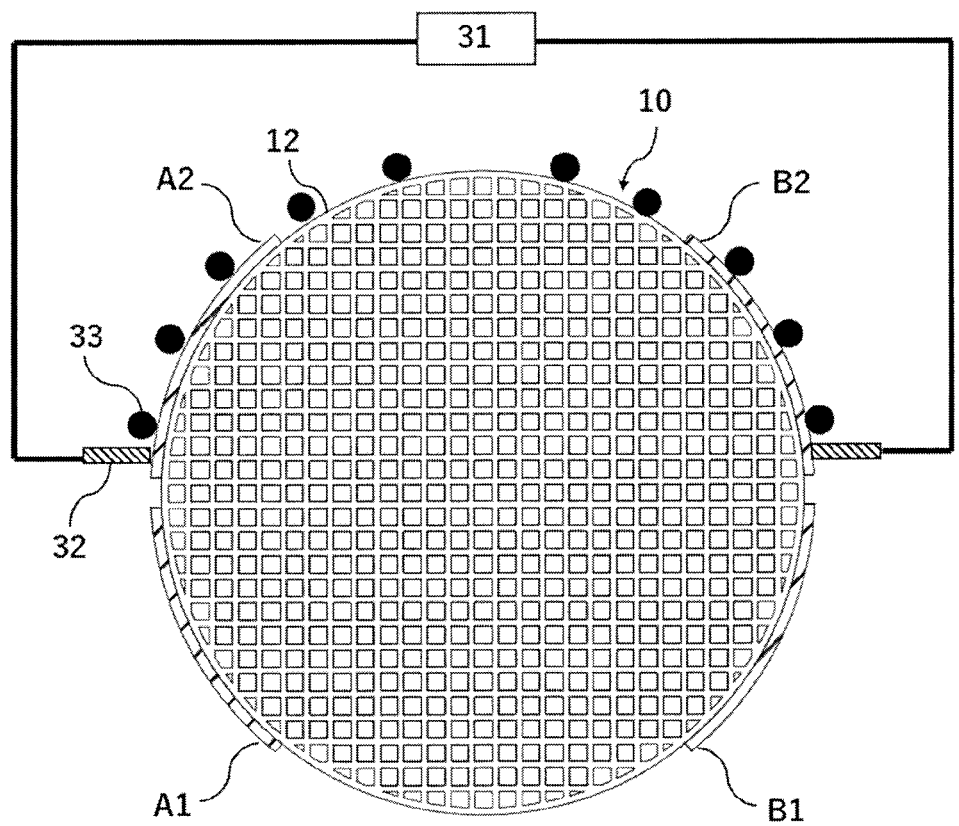
FIG. 3 is a schematic view for explaining a method of measuring a surface potential of a honeycomb structure according to an embodiment of the present invention.

Subsequently, as shown in FIG. 3, a predetermined minute current is allowed to flow between the electrode layer A2 and the electrode layer B2 to energize the pillar shaped honeycomb structure portion. At this time, the two current terminals 32 electrically connected from the power supply unit 31 are pressed against the electrode layer A2 and the electrode layer B2 of the honeycomb structure 10, respectively, to maintain the energized state. The minute current flowing between the electrode layer A2 and the electrode layer B2 is a constant current having the same magnitude as that of the minute current flowing between the electrode layer A1 and the electrode layer B1 as described above.

In a state where the predetermined minute current is allowed to flow between the electrode layer A2 and the electrode layer B2 to energize the pillar shaped honeycomb structure portion, surface potentials at multiple points spaced along the circumferential direction from the electrode layer A2 to the electrode layer B2 are measured on the surfaces of the outer peripheral wall 12 and the electrode layers A2 and B2. FIG. 3 shows, as an example, measured points 33 at three points on the electrode layer A2, four points on the surface of the outer peripheral wall 12 between the electrode layer A2 and the electrode layer B2, and three points on the electrode layer B2. The number of the measured points for the surface potentials on the electrode layer A2, the number of the measured points for the surface potentials on the outer peripheral wall 12 between the electrode layer A2 and the electrode layer B2, and the number of the measured points for the surface potentials on the electrode layer B2 are not limited to the example shown in FIG. 3, and they can be set as needed. However, it is preferable to measure the surface potentials at least two points or more for each position. A larger number of the measured points can lead to more detailed and accurate estimation of the heat generation distribution in the honeycomb structure 10.

The measurement of the surface potentials at multiple points spaced along the circumferential direction from the electrode layer A1 to the electrode layer B1 as described above, and at multiple points spaced along the circumferential direction from the electrode layer A2 to the electrode layer B2 as described above may be carried out at multiple points along the extending direction of the cells 15 of the pillar shaped honeycomb structure portion 11. According to such a configuration, the measurement is also carried out at the points along the extending direction of the cells 15 of the pillar shaped honeycomb structure portion 11, so that the heat generation distribution in the honeycomb structure 10 can be estimated in more detail and with high accuracy.

Subsequently, based on the measured surface potentials at the multiple points, at least one of resistances at the multiple points in the honeycomb structure 10 (hereinafter, also referred to as energization resistances), resistance ratios for energizing paths, voltage sharing ratios, and surface potentials of the electrode layers A1, A2, B1, and B2 is quantified. These quantifications may be carried out alone or in combination of two or more.

For the above quantification, a resistance ratio of the energization resistances may be calculated, based on: (i) a difference between the lowest surface potential at the measured points in the electrode layer A1 and the highest surface potential at the measured points in the electrode layer B1 (hereinafter, also referred to as a lower side resistance) in the measurement of the surface potentials at the multiple points; and/or (ii) a difference between the lowest surface potential at the measured points in the electrode layer A2 and the highest surface potential at the measured points in the electrode layer B2 (hereinafter, also referred to as an upper side resistance) in the measurement of the surface potentials at the multiple points as described above. That is, the resistance ratio of the energization resistances can be calculated based on a difference in surface potentials from the lowest surface potential of the electrode layer where the start point of the surface potential measurement is located to the highest surface potential of the electrode layer where the end point is located. At this time, the resistances at the multiple points in the honeycomb structure may be estimated by an average value of the surface potential difference between the start point and the end point measured at the multiple points from the electrode layer A1, over the outer peripheral wall, to the electrode layer B1, and the surface potential difference between the start point and the end point measured at the multiple points from the electrode layer A2, over the outer peripheral wall, to the top of the electrode layer B2.

For the above quantification, the surface potentials of the electrode layers A1, A2, B1 and B2 are quantified by calculating a total voltage of the electrode layers A1, A2, B1 and B2 from (iii) the surface potential of the electrode layer A1 and the surface potential of the electrode layer B1 obtained by measuring the surface potentials at the multiple points in the electrode layer A1 and the electrode layer B1, and/or (iv) the surface potential of the electrode layer A2 and the surface potential of the electrode layer B2 obtained by measuring the surface potentials at the multiple points in the electrode layer A2 and the electrode layer B2, and calculating a total voltage sharing ratio of the electrode layers A1, A2, B1 and B2 relative to the whole voltage.

Further, for the above quantification, the resistance ratio of the energizing paths of the honeycomb structure 10 is calculated from the upper side resistance and the lower side resistance to obtain a ratio of the upper side resistance (upper side resistance/(upper side resistance+lower side resistance)).

As in the above example, at least one of the resistance ratios for the energizing paths, the voltage sharing ratios of the energizing paths, and the surface potentials of the electrode layers A1, A2, B1, and B2 of the honeycomb structure 10 is quantified, and based on these quantified values, the heat generation distribution in the honeycomb structure 10 is estimated. Examples of the estimation of the heat generation distribution include setting of the following first to third indices for a desirable heat generation distribution (such as a lower bias of the heat generation) by comparing the values of the resistance ratios for the energizing paths, the voltage sharing ratios of the energizing paths and the total voltage sharing ratio of the electrode layers relative to the whole voltage, with the relationship of the heat generation distribution for these values. Examples of the comparison with the relationship of the heat generation distribution include a method of determining a temperature difference at positions described below when each of the honeycomb structures (each of samples) with the quantified surface potentials is energized to generate heat under predetermined energizing heat generation conditions (in Specific Example as described below, an electric power of 1.5 kW, and an applied time of 20 seconds), and comparing the relationship of the heat generation distribution with the relationship of the temperature difference.

Figure 5:
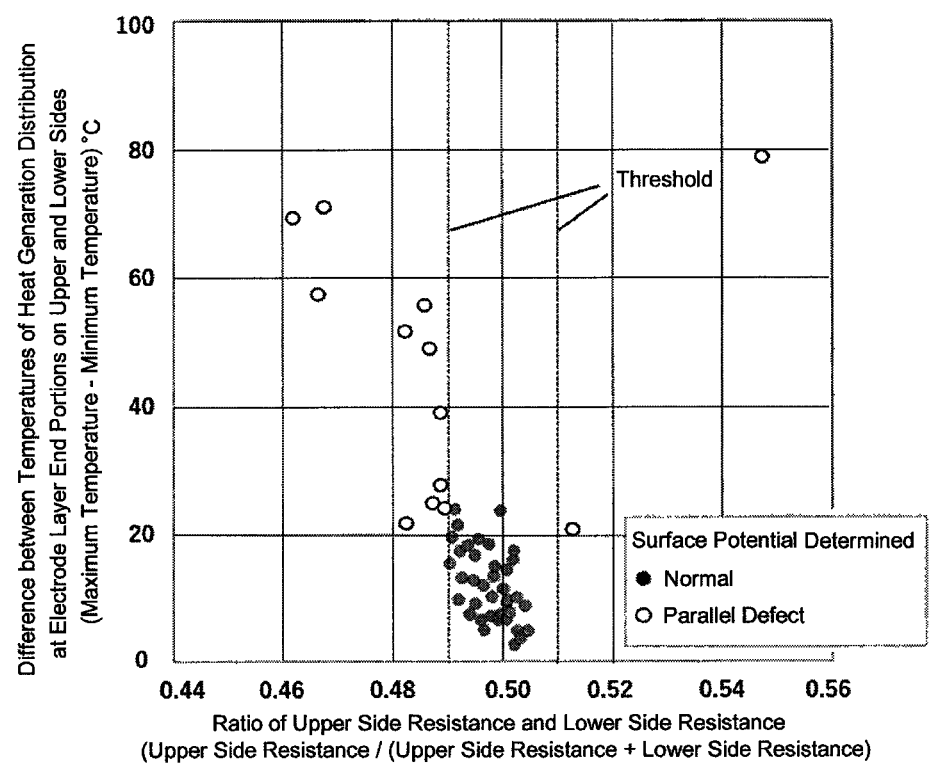
FIG. 5 is a graph showing a relationship between a ratio of an upper side resistance and a lower side resistance and a temperature difference (° C.) of heat generation distributions at end portions of upper and lower side electrode layers.

For the resistance ratio for the energizing paths (upper side and lower side), it is possible to determine whether or not the heat generation distribution is desirable by the following first index:

First Index: an index indicating that a value calculated by measuring a resistance ratio of the upper side resistance and the lower side resistance (upper side resistance/(upper side resistance+lower side resistance)) as described above is 0.50±α (constant value). As shown in FIG. 5, the α (constant value) is set from a plot where normal samples are located, in which the normal samples are determined by plotting a value of the resistance ratio (the ratio of the upper side resistance and lower side resistance) for the energizing paths on a horizontal axis and a difference between the maximum temperature and the minimum temperature of the heat generation distributions at the end portions of the upper side and lower side electrode layers on a vertical axis for each sample, and considering samples in which the desirable heat generation distribution (a lower heat generation distribution between the maximum temperature and the minimum temperature, and a lower bias of the heat generation) is obtained therefrom to be normal.

Figure 6:
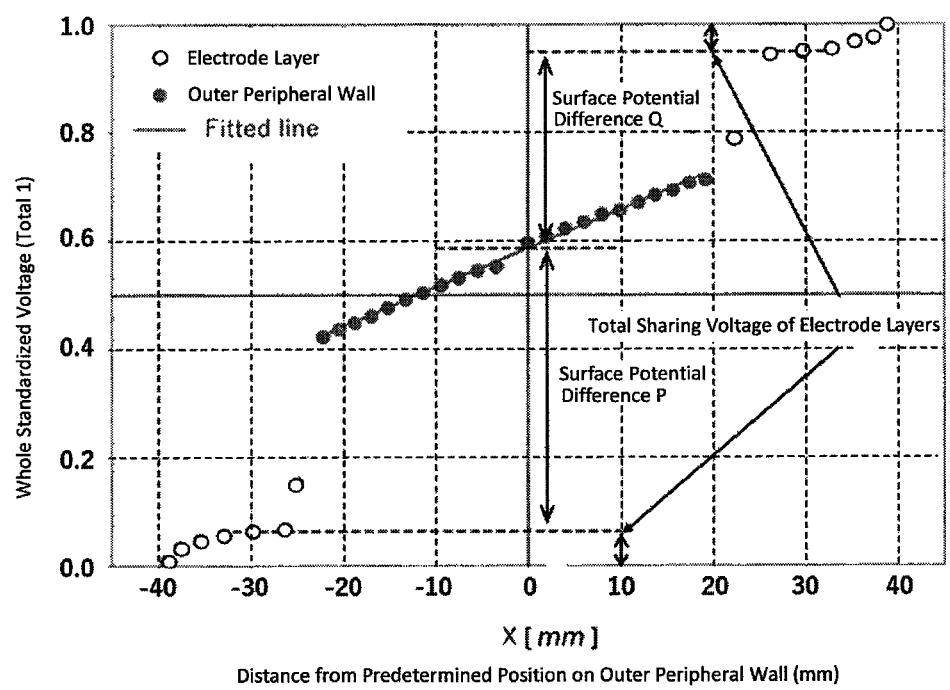
FIG. 6 is a graph showing a relationship between a distance from a predetermined position of an outer peripheral wall and a whole standardized voltage.
Figure 7:
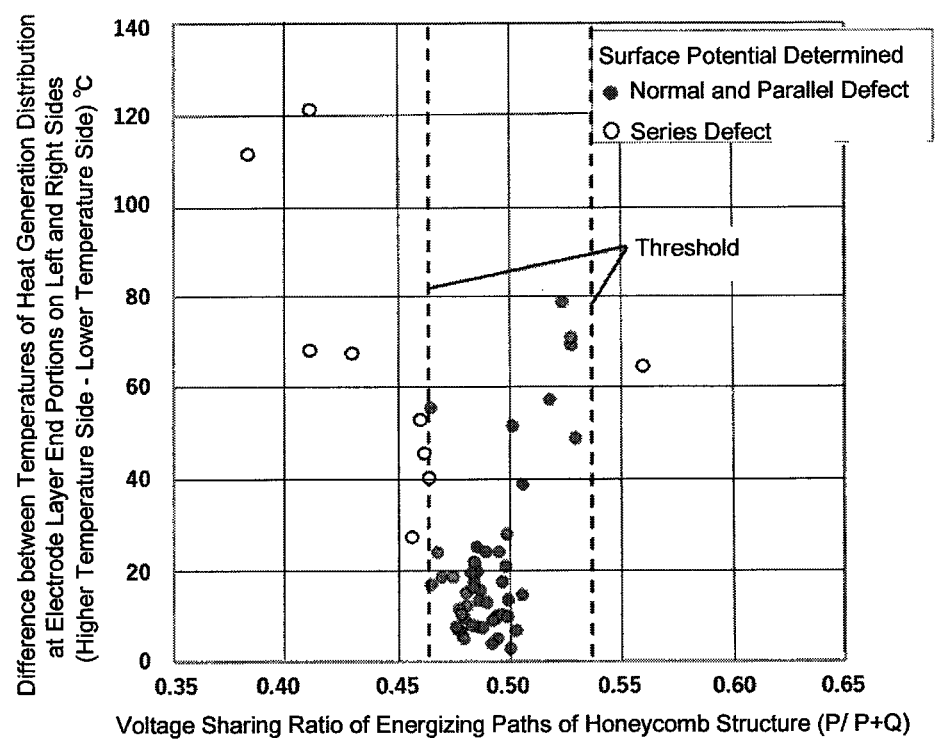
FIG. 7 is a graph showing a relationship between a value of a voltage sharing ratio of an energizing path of a honeycomb structure and a temperature difference (° C.) in heat generation distributions at end portions of left side and right side electrode layers.

For the voltage sharing ratio of the energizing path, it is possible to determine whether or not the heat generation distribution is desirable by the following second index:

Second Index: an index indicating that a voltage sharing ratio (P/P+Q) of the energizing path of the honeycomb structure is 0.50±α (constant value), in which P is a surface potential difference between the electrode layer A1 or the electrode layer A2 and the outer peripheral wall of the honeycomb structure, obtained by the measurement, and Q is a surface potential difference between the electrode layer B1 or the electrode layer B2 and the outer peripheral wall of the honeycomb structure. In this case, as shown in FIG. 6, for each surface potential on the upper side (on the electrode layers A2 and B2 side) and on the lower side (on the electrode layers A1 and B1 side) of the honeycomb structure, the voltage sharing ratios on the left side (on the electrode layers A1 and A2 side) and the right side (on the electrode layers B1 and B2 side) of the honeycomb structure are calculated from the equation: the surface potential on the left side (surface potential difference P)/the total surface potential on the left side and the right side (surface potential difference P+Q) of the honeycomb structure in the graph shown in FIG. 6. In FIG. 6, the horizontal axis indicates a distance from a predetermined position of the outer peripheral wall, and the vertical axis indicates a surface potential at the measured point when the total voltage is standardized assuming that a surface potential difference (total voltage) between the point where the surface potential is the lowest and the point where the surface potential is the highest is 1. As shown in FIG. 7, the α (constant value) is set from a plot where normal samples are located, in which the normal samples are determined by plotting on a horizontal axis a value of the voltage sharing ratio of the energizing paths and on a vertical axis a difference between the temperatures of the electrode layer end portion on the higher temperature side and the electrode layer end portion on the lower temperature side in the heat generation distributions at the end portions of the upper side and lower side electrode layers for each sample, and considering samples in which the desirable heat generation distribution (a lower heat generation distribution between the temperatures of the electrode layer end portions in the heat generation distribution, and a lower bias of the heat generation) is obtained therefrom to be normal.

For the quantification of the surface potentials of the electrode layers A1, A2, B1 and B2, it is possible to determine whether or not the heat generation distribution is desirable by the following third index:

Third Index: as shown in FIG. 6, the total sharing voltage R of the electrode layer A1 (B1) and the electrode layer A2 (B2) obtained by the measurement is calculated, and the total voltage sharing ratio (R/1) of the electrode layers to the whole voltage (whole standardized voltage) is calculated. As for the whole voltage, in the surface potential measurement of the upper half or the lower half of the honeycomb structure, the surface potential difference between the point where the surface potential is the lowest and the point where the surface potential is the highest is standardized as 1, and this is defined as the whole standardized voltage. The total sharing voltage of the electrode layers means the sum of the surface potential difference between the point where the surface potential is the lowest and the end portion of the electrode layer, and the surface potential difference between the point where the surface potential is the highest and the end portion of the electrode layer.

Figure 8:
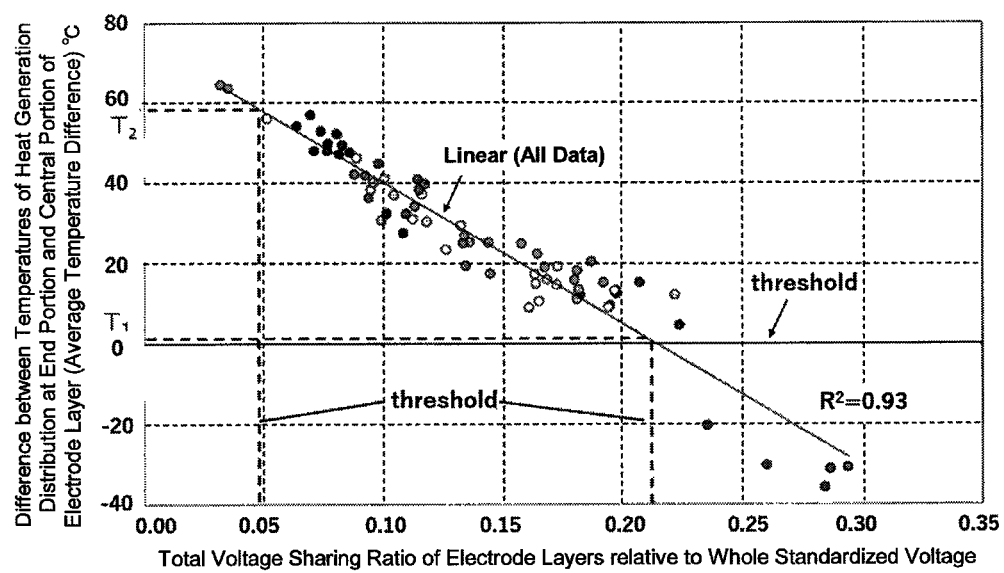
FIG. 8 is a graph showing a relationship between a value of a total voltage sharing ratio of electrode layers relative to a whole standardized voltage and a temperature difference (° C.) in heat generation distributions between an end portion and a central portion of an electrode layer.

The third index is an index in which for the total voltage sharing ratio of the electrode layers, the voltage sharing ratio of the electrode layers in which the temperature difference in the heat generation distribution between the end portion of the electrode layer and the central portion of the electrode layer is $T_1°$ C. or higher is defined as an upper limit threshold value, and the voltage sharing ratio of the electrode layers in which the temperature difference in the heat generation distribution between the end portion of the electrode layer and the central portion of the electrode layer is $T_2°$ C. or lower is defined as a lower limit threshold value. For example, $T_1$ may be 0° C. or higher in order to facilitate the distribution of the current from the central portion to the end portion of the electrode layer. On the other hand, $T_2$ can be appropriately set based on the diameter and volume of the honeycomb structure, the electrical resistivities of the honeycomb structure portion and the electrode layers, and the like. In FIG. 8, the values of each sample are plotted with the value of the total voltage sharing ratio of the electrode layers on the horizontal axis and the temperature difference (° C.) in the heat generation distribution between the end portion of the electrode layer and the central portion of the electrode layer on the vertical axis. In this case, it is presumed that the sample located between the lower threshold value and the upper threshold value has the desirable heat generation distribution (a lower difference between the maximum temperature and the minimum temperature of the heat generation distribution, and a lower bias of the heat generation).

According to the method for estimating the heat generation distribution in the honeycomb structure according to the embodiment of the present invention, the minute current enough not to cause heat generation of the honeycomb structure 10 can allow to flow and a plurality of surface potentials of the honeycomb structure 10 can be measured, and based on the measured surface potentials, at least one of the resistances at multiple points in the honeycomb structure, the resistance ratios for the energization paths, the voltage sharing ratios, and the surface potentials of the electrode layers A1, A2, B1 and B2 can be quantified, and based on the quantified values, the desirable heat generation distribution can be estimated. Therefore, the honeycomb structure or the electrically heating support does not require heat generation and further cooling, and the inspection can be carried out with low power consumption (low cost), so that the estimation can easily and inexpensively be carried out. Further, according to the method for estimating the heat generation distribution in the honeycomb structure according to the embodiment of the present invention, the divided electrode layers enable the resistance ratio and the voltage sharing ratio of the energizing paths (upper/lower side) to be calculated, and also enable the total voltage sharing ratios in the electrode layers to be calculated, and based on the values, the desirable heat generation distribution in the honeycomb structure to be estimated.

<Method for Producing Honeycomb Structure>

In a method for producing a honeycomb structure according to an embodiment of the present invention, first, at least one of the resistances at multiple points in the honeycomb structure 10, the resistance ratios for the energizing paths, the voltage sharing ratios, and surface potentials of the electrode layers A1, A2, B1, and B2 is quantified to calculate its quantified value by the method for estimating the heat generation distribution in the honeycomb structure according to the embodiment of the present invention as described above.

The quantified value based on the threshold values obtained in the step of estimating the heat generation distribution in the honeycomb structure 10 is then evaluated, and passed products are selected. Criteria for selecting the passed products can be appropriately set based on the threshold values required for the honeycomb structure 10. For example, the criteria for selecting the passed products are such that the predetermined minute current is allowed to flow to quantify the resistance ratio for the energizing paths, the voltage sharing ratios, and the surface potentials of the electrode layers A1, A2, B1 and B2, and based on the threshold values obtained in the step of estimating the heat generation distribution in the honeycomb structure, the evaluation with the first to third indices indicating that the heat generation distribution is desirable is carried out, and the samples satisfying the threshold values indicated by the indices are determined to be the passed products, and the like.

According to the method for producing the honeycomb structure according to the embodiment of the present invention, the quantified values can be calculated, the predetermined indices can be provided, and the quantified values can be evaluated based on the threshold values for the indices, so that a honeycomb structure selected as a passed product can be obtained. Therefore, a honeycomb structure selected based on high accuracy evaluation can easily and inexpensively be obtained.

<Method for Producing Electrically Heating Support>
(1. Electrically Heating Support)

Figure 4:
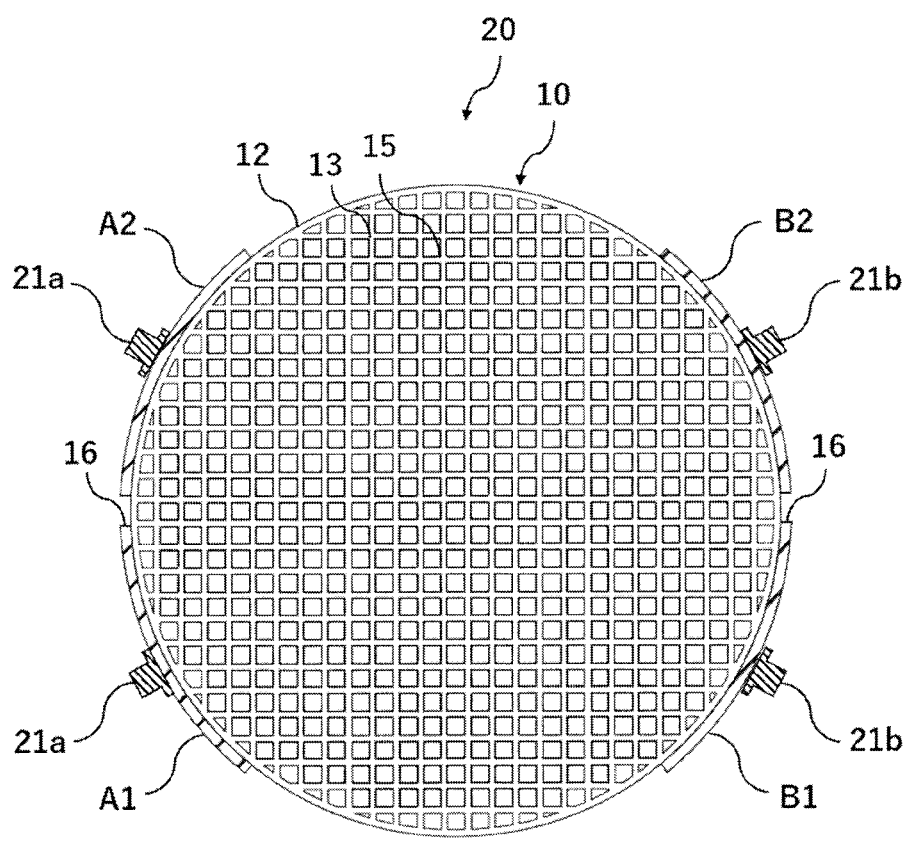
FIG. 4 is a schematic cross-sectional view perpendicular to an extending direction of cells of an electrically heating support according to an embodiment of the present invention.

FIG. 4 is a schematic cross-sectional view of an electrically heating support 20 according to an embodiment of the present invention, which is perpendicular to the extending direction of the cells. The electrically heating support 20 includes the honeycomb structure 10 and metal terminals 21a, 21b.

(2. Metal Terminal)

The metal terminals 21a, 21b are provided on the electrode layers A1 and A2, and the electrode layers B1 and B2, respectively, and are electrically connected. Accordingly, as a voltage is applied to the metal terminals 21a, 21b through the electrode layers A1, A2, B1 and B2, then the electricity is conducted through the metal terminals 21a, 21b to allow the honeycomb structure 10 to generate heat by Joule heat.

The material of the metal terminals 21a, 21b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal terminals 21a, 21b are not particularly limited, and they can be appropriately designed according to the size of the electric heating type support 20, the electrical conduction performance, and the like.

By supporting the catalyst on the electrically heating support 20, the electrically heating support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(3. Method for Producing Electrically Heating Support)

In a method for producing an electrically heating support according to an embodiment of the present invention, first, the honeycomb structure 10 is prepared, and the metal terminals 21a, 21b are provided on the electrode layers A1, A2, B1 and B2 of the honeycomb structure 10 by welding or thermal spraying.

Subsequently as described above, the quantified value in the third step of the honeycomb structure 10 before the inspection (specifically, before the inspection step described later) is calculated by the method for estimating the heat generation distribution in the honeycomb structure according to the embodiment of the present invention.

Subsequently, an inspection step is carried out by, based on the threshold value obtained in the step of estimating the heat generation distribution in the honeycomb structure 10, evaluating the quantified value in the third step is evaluated, and selecting passed products. By such an inspection step, the electrically heating support 20 can be produced. By the method for estimating the heat generation distribution in the honeycomb structure 10, the quantified value in the third step of the honeycomb structure 10 before the inspection may be evaluated to select the passed products, and the metal terminals 21a, 21b may be then provided on the electrode layers A1, A2, B1 and B2 of the honeycomb structure 10 that is the passed product.

Criteria for selecting the passed products can be appropriately set based on the threshold values required for the honeycomb structure 10 that can have the desirable heat generation distribution. For example, the criteria for selecting the passed products that can be used herein may be the criteria for selecting the passed products shown in the method for producing the honeycomb structure as described above.

(4. Specific Example)

Hereinafter, specific examples will be illustrated for better understanding of the present invention and its advantages. However, the present invention is not limited to the specific examples.

<Specific Example 1>

(1. Preparation of Honeycomb Structure)

A honeycomb structure having the configuration shown in FIG. 1 is prepared. The honeycomb structure is made of Si—SiC, and has circular end faces each having a diameter of 100 mm, and a height (length in the flow path direction of the cells) of 100 mm. The cell density is 93 cells/cm$^2$, the thickness of the partition wall is 101.6 μm, the porosity of the partition wall is 45%, and the average pore diameter of the partition wall is 8.6 μm.

The electrode layers A1, A2, B1 and B2 of the honeycomb structure are made of Si—SiC, and the width of the slit between the electrode layer A1 and the electrode layer A2 and the width of the slit between the electrode layer B1 and the electrode layer B2 are 1.5 mm, respectively. The thickness of each of the electrode layers A1, A2, B1 and B2 is 0.2 mm.

Further, the honeycomb structure is provided with slits (thermal stress relaxation slits) each having a width of 1.5 mm along the extending direction of the cells on the outer peripheral wall, between the surface provided with the electrode layer A1 and the surface provided with the electrode layer B1, and between the surface provided with the electrode layer A2 and the surface provided with the electrode layer B2.

(2. Energization Test)

Next, as shown in FIG. 2, two current terminals electrically connected from the power supply unit are pressed against the electrode layer A1 and the electrode layer B1 of the honeycomb structure, respectively, and a constant current (minute current) of 40 mA is applied to energize them.

Subsequently, while energizing the honeycomb structure, the surface potentials are measured at 36 points in total, spaced along the circumferential direction from the electrode layer A1 to the electrode layer B1 on the outer peripheral wall and the surfaces of the electrode layers A1 and B1.

Next, as shown in FIG. 3, two current terminals electrically connected from the power supply unit are pressed against the electrode layer A2 and the electrode layer B2 of the honeycomb structure, respectively, and a constant current (minute current) of 40 mA is applied to energize them.

Subsequently, while energizing the honeycomb structure, the surface potentials are measured at 36 points in total, spaced along the circumferential direction from the electrode layer A2 to the electrode layer B2 on the outer peripheral wall and the surfaces of the electrode layers A2 and B2.

Figure 9:
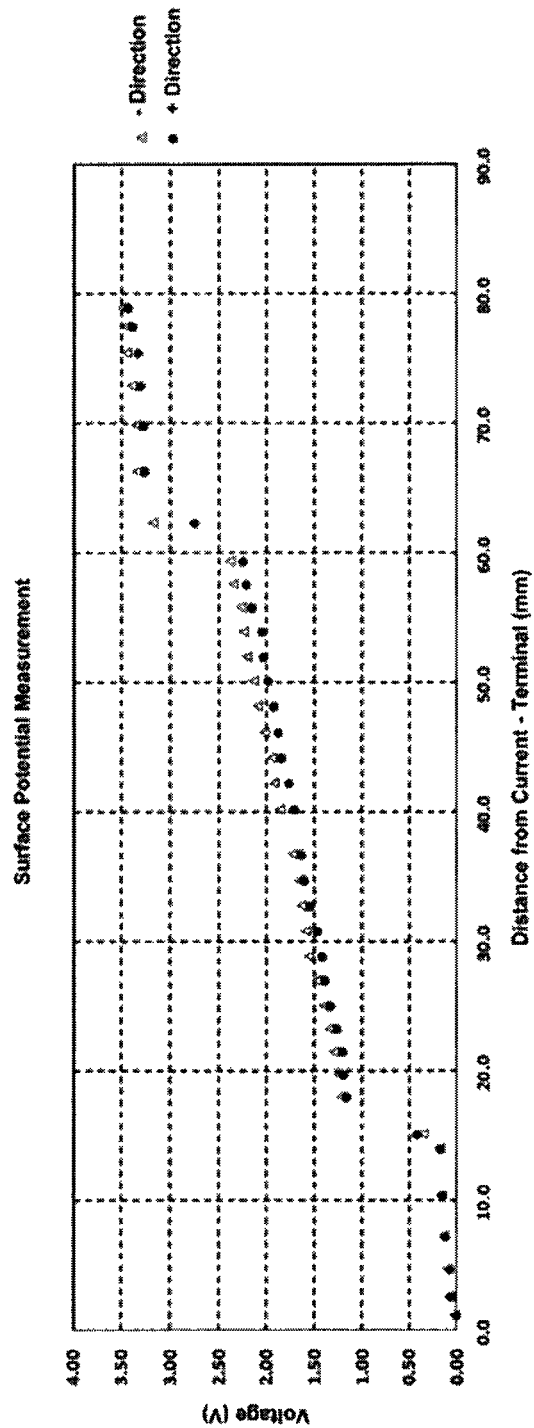
FIG. 9 is a graph showing a relationship between a measured position of a surface potential and a surface potential according to Specific Example 1.

FIG. 9 shows a graph illustrating relationships between the positions of the 36 points measured from the electrode layer A1, over the outer peripheral wall, to the electrode layer B1, and their surface potentials, and between the positions of the 36 points measured from the electrode layer A2, over the outer peripheral wall, to the electrode layer B2, and their surface potentials.

(3. Quantification of Surface Potential, Estimation of Heat Generation Distribution)

The resistances (energization resistances) at multiple points in the honeycomb structure, the resistance ratios for the energizing paths, the voltage sharing ratios, and the surface potentials of the electrode layers A1, A2, B1 and B2 are quantified. Regarding the estimation of the heat generation distribution, for each of samples (a plurality of honeycomb structures), the temperature difference as described later was obtained when energization and heat generation are carried out at a power of 1.5 kW and an application time of 20 seconds.

For the quantification of the surface potential, specifically, the resistances at the multiple points in the honeycomb structure are estimated from an average value of the surface potential differences between the start point and the end point measured at 36 points from the electrode layer A1 over the outer wall to the electrode layer B1, and the surface potential differences between the start point and the end point measured at 36 points from the electrode layer A2 over the outer wall to the electrode layer B2.

The total sharing voltage (R) of the electrode layers A1, A2, B1 and B2 is calculated from a surface potential data for a lower surface potential of either the electrode layers A1 and B1 or the electrode layers A2 and B2, and the total voltage sharing ratio (R/1) of the electrode layers relative to the whole voltage (whole standardized voltage) is calculated.

The same calculation of the total voltage sharing ratio of the electrode layers is carried out for each of honeycomb structures (each of samples), and as shown in FIG. 8, for each of the samples, the value of the total voltage sharing ratio of the electrode layers relative to the whole standardized voltage is plotted on the horizontal axis, and the temperature difference (° C.) of the heat generation distribution between the end portion of the electrode layer and the central portion of the electrode layer is plotted on the vertical axis. For the value of the total voltage sharing ratio of the electrode layers, the voltage sharing ratio that is the upper limit threshold value and the voltage sharing ratio that is the lower limit threshold value are set, and a sample located between the lower limit threshold value and the upper limit threshold value is estimated as that having a desirable heat generation distribution (a lower average temperature difference in the heat generation distribution, and a lower bias of the heat generation).

The resistance ratio of the energizing paths of the honeycomb structure is calculated based on a difference between the surface potential on the outer peripheral wall between the electrode layer A1 and the electrode layer B1 and the surface potential on the outer peripheral wall between the electrode layer A2 and the electrode layer B2. Specifically, a difference (lower side resistance) between the lowest surface potential of the electrode layer A1 and the highest surface potential of the electrode layer B1 at 36 points measured from the electrode layer A1 over the outer peripheral wall to the electrode layer B1 is determined. Further, a difference (upper side resistance) between the lowest surface potential of the electrode layer A2 and the highest surface potential of the electrode layer B2 at 36 points measured from the electrode layer A2 over the outer peripheral wall to the electrode layer B2 is determined. The resistance ratio of the energizing paths of the honeycomb structure is calculated by calculating a ratio of the upper side resistance and the lower side resistance (upper side resistance/(upper side resistance+lower side resistance)).

The same calculation of the resistance ratio of the energizing paths is carried out for each of honeycomb structures (each of samples), and as shown in FIG. 5, for each of the samples, a ratio of the upper side resistance and the lower side resistance for the energizing paths (the resistance ratio of the energizing paths of the honeycomb structure) is plotted on the horizontal axis, and a difference between the maximum temperature and the minimum temperature of the heat generation distributions at the end portions of the electrode layers on the upper and lower sides is plotted on the vertical axis. A threshold value (0.50±α) is set for the value of the ratio of the upper side resistance and the lower side resistance for the energizing paths, and a sample located within the threshold value is estimated as that having a desirable heat generation distribution (a lower difference between the maximum temperature and the minimum temperature of the heat generation distribution, and a lower bias of the heat generation).

The voltage sharing ratio of the energizing paths of the honeycomb structure is calculated from a surface potential data for a lower surface potential of either the electrode layers A1 and B1 or the electrode layers A2 and B2. Specifically, a surface potential difference P between a point where the surface potential of the electrode layer A1 (or the electrode layer A2) is constant and a predetermined position on the outer peripheral wall, and a surface potential difference Q between a point where the surface potential of the electrode layer B1 (or the electrode layer B2) is constant and a predetermined position on the outer peripheral wall are calculated, and based on the surfaces potential differences P and Q, the voltage sharing ratio (P/P+Q) of the energizing paths is calculated. It should be noted that the predetermined position of the outer peripheral wall means a position where a distance between the electrode layer A1 (or the electrode layer A2) and the position where the outer peripheral wall is present (the left half of the outer peripheral wall), and a distance between the electrode layer B1 (or the electrode layer B2), and the position where the outer peripheral wall is present (the right half of the outer peripheral wall) are equal to each other.

The same calculation of the voltage sharing ratio of the energizing paths is carried out for each of honeycomb structures (each of samples), and as shown in FIG. 7, for each of the samples, the value of the voltage sharing ratio of the energizing paths is plotted on the horizontal axis, and a temperature difference between the end portion of the electrode layer on the higher temperature side and the end portion of the electrode layer on the lower temperature side in the heat generation distribution at the end portions of the electrode layer on left and right sides is plotted on the vertical axis. A threshold value (0.50±α) is set for the value of the voltage sharing ratio of the energizing paths, and a sample located within this threshold value is assumed as that having a desirable heat generation distribution (a lower difference between the maximum temperature and the minimum temperature of the heat generation distribution, and a lower bias of the heat generation).

As described above, the resistance ratios for the energizing paths in the plurality of honeycomb structures (each of samples), the voltage sharing ratios of the energizing paths, and the surface potentials of the electrode layers A1, A2, B1 and B2 (total voltage sharing ratio of the electrode layers) are quantified, and based on these, the heat generation distribution in the honeycomb structure is estimated, and a sample having a desirable heat generation distribution is estimated. Specifically, the resistance ratio for the energizing paths, the voltage sharing ratio of the energizing paths on the lower resistance side, and the total voltage sharing ratio of the electrode layers relative to the whole standardized voltage on the lower resistance side are calculated, and these calculated values are compared with a relationship between the calculated values and the heat generation distribution for those values, and the first to third indices as described above, which indicate the desirable heat generation distribution, are set to estimate the heat generation distribution in the honeycomb structure.

It is also possible to estimate the resistance difference between the measured value of the surface potential and a design value of the honeycomb structure by comparing the measured value of the surface potential with design value of the surface potential.

As shown in Specific Example 1, the heat generation performance can be estimated by measuring the change in the surface potential of the honeycomb structure by passing the minute current enough not to cause the honeycomb structure to generate heat, and quantifying its distribution. Therefore, the heat generation distribution in the honeycomb structure can easily and inexpensively be estimated.

DESCRIPTION OF REFERENCE NUMERALS 10 honeycomb structure
11 pillar shaped honeycomb structure
12 outer peripheral wall
13 partition wall
15 cell
16 slit
20 electrically heating support
21a, 21b metal terminal
31 power supply unit
32 current terminal
33 measured point
A1, A2, B1, B2 electrode layer

The invention claimed is:

1. A method for estimating a heat generation distribution in a honeycomb structure, the honeycomb structure comprising:
a pillar shaped honeycomb structure portion comprising: an outer peripheral wall; and a partition wall disposed on an inner side of the outer peripheral wall, the partition wall defining a plurality of cells, each of the plurality of cells extending from one end face to other end face to form a flow path; and
a pair of an electrode layer A and an electrode layer B disposed on a surface of the outer peripheral wall of the pillar shaped honeycomb structure portion so as to face each other across a central axis of the pillar shaped honeycomb structure portion,
wherein the electrode layer A and the electrode layer B are electrically separated into an electrode layer A1 and an electrode layer A2, and an electrode layer B1 and an electrode layer B2, respectively,
wherein the electrode layer A1 and the electrode layer B1, and the electrode layer A2 and the electrode layer B2 are located on sides close to each other on the outer peripheral surface of the honeycomb structure, respectively,
wherein the method comprises:
a first step of allowing a predetermined minute current to flow between the electrode layers A1 and B1 to energize the pillar shaped honeycomb structure, and measuring surface potentials at multiple points spaced along a circumferential direction from the electrode layer A1 to the electrode layer B1 on the surface of the outer peripheral wall and surfaces of the electrode layers;
a second step of allowing a predetermined minute current to flow between the electrode layers A2 and B2 to energize the pillar shaped honeycomb structure, and measuring surface potentials at multiple points spaced along a circumferential direction from the electrode layer A2 to the electrode layer B2 on the surface of the outer peripheral wall and surfaces of the electrode layers;
a third step of quantifying, based on the measured surface potentials at the multiple points, at least one of resistances at the multiple points in the honeycomb structure, resistance ratios for energization paths, voltage sharing ratios, and surface potentials of the electrode layers A1, A2, B1 and B2; and
a step of estimating a heat generation distribution in the honeycomb structure based on the values quantified in the third step.

2. The method for estimating the heat generation distribution in the honeycomb structure according to claim 1, wherein the surface potentials at the multiple points spaced along the circumferential direction from the electrode layer A1 to the electrode layer B1, and the surface potentials at the multiple points spaced along the circumferential direction from the electrode layer A2 to the electrode layer B2 are respectively measured at multiple points along the extending direction of the cells of the pillar shaped honeycomb structure portion.

3. The method for estimating the heat generation distribution in the honeycomb structure according to claim 1, wherein the electrode layer A1 and the electrode layer A2, and the electrode layer B1 and the electrode layer B2, are electrically separated from each other by slits.

4. The method for estimating the heat generation distribution in the honeycomb structure according to claim 1, wherein:
in the first step, the measurement of the surface potentials at the multiple points comprises measuring the surface potentials at two or more points of each of the electrode layer A1, the electrode layer B1, and the surface of the outer peripheral wall between the electrode layers A1 and B1; and
in the second step, the measurement of the surface potentials at the multiple points comprises measuring the surface potentials at two or more points of each of the electrode layer A2, the electrode layer B2, and the surface of the outer peripheral wall between the electrode layers A2 and B2.

5. The method for estimating the heat generation distribution in the honeycomb structure according to claim 1, wherein the third step comprises calculating the resistance ratio of the energization resistances based on surface potential difference(s) of (i) and/or (ii) below:
(i) a difference between a lowest surface potential at measured points in the electrode layer A1 and a highest surface potential at measured points in the electrode layer B1, in the measurement of the surface potentials at the multiple points in the first step; and
(ii) a difference between a lowest surface potential at measured points in the electrode layer A2 and a highest surface potential at measured points in the electrode layer B2, in the measurement of the surface potentials at the multiple points in the second step.

6. The method for estimating the heat generation distribution in the honeycomb structure according to claim 1, wherein the third step comprises calculating a total voltage of the electrode layers A1, A2, B1 and B2 from the surface potential(s) of (iii) and/or (iv) below, and calculating a total voltage sharing ratio of the electrode layers A1, A2 and B1 relative a whole voltage:
(iii) a surface potential of the electrode layer A1, and a surface potential of the electrode layer B1, the surface potentials of the electrode layer A1 and the electrode layer B1 being measured at multiple points in the first step; and/or
(iv) a surface potential of the electrode layer A2, and a surface potential of the electrode layer B2, the surface potentials of the electrode layer A2 and the electrode layer B2 being measured at multiple points in the second step.

7. The method for estimating the heat generation distribution in the honeycomb structure according to claim 1, wherein the third step comprises calculating a voltage sharing ratio (P/P+Q) of the energizing paths of the honeycomb structure from surface potential differences P and Q described in (v) below:
(v) the surface potential difference P between the electrode layer A1 or the electrode layer A2 and the outer peripheral wall in the first step, and the surface potential difference Q between the electrode layer B1 or the electrode layer B2 and the outer peripheral wall in the second step.

8. A method for producing a honeycomb structure, comprising:
a step of calculating the quantified values in the third step of the honeycomb structure before inspection by the method for estimating the heat generation distribution in the honeycomb structure according to claim 1; and
an inspection step of evaluating the quantified values in the third step based on threshold values obtained in the step of estimating the heat generation distribution in the honeycomb structure, and selecting a passed product.

9. A method for producing an electrically heating support, comprising:
 a step of calculating the quantified values in the third step of the honeycomb structure before inspection by the method for estimating the heat generation distribution in the honeycomb structure according to claim 1; and
 an inspection step of evaluating the quantified values in the third step based on threshold values obtained in the step of estimating the heat generation distribution in the honeycomb structure, and selecting a passed product.

10. The method for producing the electrically heating support according to claim 9,
 wherein the method for producing the electrically heating support comprises a step of providing metal terminals on the electrode layer A and the electrode layer B of the honeycomb structure before the inspection, respectively, before the step of calculating the quantified value in the third step of the honeycomb structure.

11. The method for producing the electrically heating support according to claim 9, wherein the method for producing the electrically heating support comprises a step of providing metal terminals on the electrode layer A and the electrode layer B of the honeycomb structure, respectively, after the inspection step.

\* \* \* \* \*